(No Model.)
J. R. WALSH.
FEED HOPPER.
No. 252,633. Patented Jan. 24, 1882.
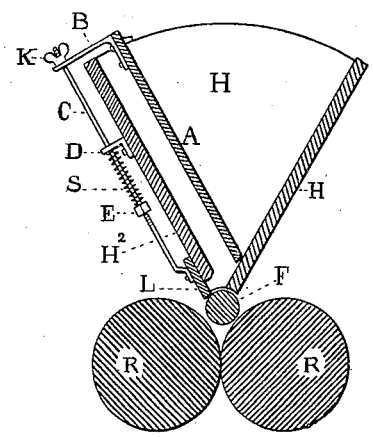
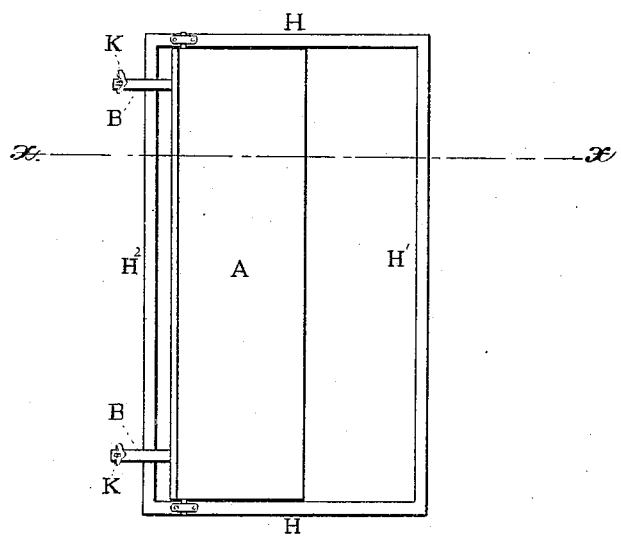
Witnesses:
Rich'd. A. Goldsbrough
J. M. Moore.
Inventor,
James R. Walsh.
per Artimas B. Upham,
Attorney

UNITED STATES PATENT OFFICE.

JAMES R. WALSH, OF PEORIA, ILLINOIS.

FEED-HOPPER.

SPECIFICATION forming part of Letters Patent No. 252,633, dated January 24, 1882.

Application filed August 17, 1881. (No model.)

*To all whom it may concern:*

Be it known that I, JAMES R. WALSH, of Peoria, in the county of Peoria, in the State of Illinois, have invented an Improvement in Feed-Hoppers; and I do hereby declare that the following is a full, clear, and exact description thereof, reference being had to the annexed drawings, making a part of this specification, in which like letters of reference refer to like parts, and in which—

Figure 1 represents vertical section through $x\ x$; Fig. 2, plan.

The object of this invention is to so regulate the flow of grain from a feed-hopper that the grain shall issue in a stream wide as the hopper is long, and having its thickness proportional to the quantity of grain entering said hopper.

H H are the ends, and H' H² the sides, of the feed-hopper.

A is a board extending the whole length of the hopper, and having its upper corners pivoted to the ends H H.

B B are two ang'e-irons, having one arm of each fastened to the board A and the other extending beyond the outside of the hopper H. To each of these projecting arms I attach, by means of the set-nuts K K, a slender iron rod, C, that is fastened at its lower extremity to the slide L.

D is a brace through which said rod C passes, and which is fastened to the side H² of the feed-hopper.

E is a nut, by which the pressure of the springs S is communicated to and regulated on said rods C.

In Fig. 1 this hopper is shown in connection with a pair of crushing-rollers, R R, of a roller mill. F is the feed-roller.

The operation of this feed-hopper is as follows: When there is no grain in the hopper the pressure of the springs S S holds the board A against the side H' of the hopper and keeps the slide L down against the feed-roller F. When grain is first let into this hopper it accumulates upon the board A until the weight overcomes the pressure of the springs S S and a thin wide stream of grain is allowed to escape downward. At the same time that the board A drops the slide L is lifted to allow the grain to escape between it and the feed-roller F. As more grain accumulates in the hopper the opening between said board A and side H' is enlarged, the slide L raised higher, and more grain flows out until the amounts entering and issuing from this hopper are equal.

It will be readily seen that if we remove the slide L from the hopper the board A alone, pressed against the opposite side of the hopper by the arrangement of the angle-irons B, springs S, and other parts shown, serves to distribute the grain evenly to the feed-roll F almost as well as do the slide L and it together. The slide L only operates to spread into a slightly thinner stream the grain that comes down to it from the board A. In this way no more grain comes upon the feed-roller F at one point than at another, but is evenly distributed throughout its entire length.

In other feed-hoppers the slide L is usually changed by hand when it is necessary to admit more or less grain onto the rollers R R.

What I claim as my invention, and for which I desire Letters Patent, is as follows, to wit:

1. In combination with the feed-hopper H, the board A, pivoted at its upper corners to the ends of said hopper, the angle-irons B B, rods C C, springs S S, braces D D, set-nuts E E and K K, slide L, and roll F, as and for the purpose set forth.

2. In automatic feeders for grain-hoppers, the board A, pivoted at its upper corners to said hopper, in combination with the angle-irons B B, rods C C, springs S S, set-nuts E E K K, and braces D D, substantially as and for the purpose specified.

In testimony that I claim the foregoing invention I have hereunto set my hand this 13th day of August, 1881.

JAMES R. WALSH.

Witnesses:
J. M. MORSE,
H. W. WELLS.